United States Patent Office 3,142,576
Patented July 28, 1964

3,142,576
PROCESS FOR PRODUCING PRIME STEAM LARD
John E. Thompson, P.O. Box 2023, Chicago, Ill.
No Drawing. Filed Nov. 27, 1961, Ser. No. 155,193
3 Claims. (Cl. 99—118)

This invention relates to an improved method of steam rendering lard, grease, tallow, etc. from animal substances.

More in particular this invention comprises the combination of steps used in rendering fat, particularly lard, comprising heating the material in a kettle under a vacuum and with the injection of live steam and agitation.

Heretofore animal fats have been rendered by applying heat to the animal material and separating the fat from the protein. One of the principal problems has been the hydrolysis of the proteinaceous material which produces a water soluble glue like substance and which has a propensity to form objectionable emulsions with the fat. The fatty material so produced has a low stability. This is the historically standard method.

An improvement was made over this ancient method which comprised using a vacuum to obtain a dry rendered process. This is disclosed in Patent 1,294,736.

A continuous process for dry rendering is described in Patent 1,789,751. No prime steam was used in this process.

A prime steam rendering process was developed and disclosed in Patent 1,833,826. No mechanical agitation was employed and no vacuum was employed. It was the object of this invention to degrade the protein material which is specifically avoided in the present process.

A high temperature prime steam rendering process was developed as set forth in Patent 1,854,270 and is quite similar to the process used today for the production of prime steam lard. It is a digestion process and depends upon the high temperature or high pressure steam for the source of heat. There is no vacuum used in this process and the proteinaceous material is very quickly completely digested, that is, rendered soluble, and has all of the disadvantages of solubilized proteinaceous material which is hard to separate and represents a substantial disposal problem.

A wet rendering process was set forth in Patent 2,742,488, and well recognizes the objection of the wet rendering process with the loss of protein and the necessity for a tankage dryer and also the development of an off-flavor. The dry rendering process is set forth extensively in this patent and it is pointed out, the comparatively high color, low stability and the strong flavor of the resulting product. This method substitutes in part mechanical rupture of the fat cells for heat rendering and inert gas is used to prevent contact of the fat with the air during the process.

A process developed in Denmark some years ago is disclosed in part in Patent 2,748,152 and this process relies on finely ground fat. The product of this process is a fat having low stability and this process seeks the degradation of the proteinaceous material to the gelatine form.

A method of treating bacon skins, having a large percentage of sodium chloride is set forth in Patent 2,820,804. All of the heat applied in this process is supplied by prime steam only. There is no direct heating from the steam jacket and no vacuum is employed. The product obtained from this specific raw material disclosed in this patent has a low stability as would be expected. The liquid phase is discarded and the solid must be processed to be marketable.

It is an object of the present invention to produce a prime steam lard having a high stability.

It is a further object of this invention to produce a prime steam lard which is not contaminated by degraded protein.

In order to obtain these objects the present invention combines the use of external heat, prime steam, vacuum and agitation in a single process.

These and other objects will become apparent from the description of the preferred embodiment of this invention, as set forth in the following specification.

Briefly, the present process comprises the rendering of fat and proteinous materials in a kettle, part of the heat being supplied from the jacket of the kettle and part of the heat being supplied by the introduction of prime steam directly into the fatty material. Agitation during the treatment is desirable and the application of a vacuum to the kettle during the treatment is a necessity.

In order to illustrate this process, raw pork fat is used as an example. This pork fat is from hog dressing operations, generally unchilled and includes, leaf, caul, ruffle, head and ham facing fats. Included with fats of this type are fats originating from pork cutting operations which includes back, belly, shoulder blade, ham and loin fats in substantial quantities. Fats of this type originate from the chilled pork carcass in the process of cutting it into wholesale pork cuts. The smaller quantities of fats originating from boning operations are also included.

Preparation of the Raw Fat

The size of the pieces of fat is not critical but it is preferred that the large pieces be passed through a prebreaker. The products of this operation have a maximum dimension of 1½ x 1½ inch cubes. This size greatly facilitates handling by mechanical means, and substantially aids the ready and uniform heat penetration into the fat particles. Fine grinding is not necessary, but would increase the speed of the cooking process. This would materially increase the cost of the finished product.

A steam packeted kettle having appropriate steam lines for the injection of prime steam, and vacuum lines attached thereto is used with a high speed agitator.

Vacuum is applied throughout the cooking cycle. This was found desirable because if the vacuum was not initially applied and was applied after the heating had started and the temperature had reached 200° F. or higher, foaming would cause a loss of the product and a fouling of the vacuum line. If the material of the load had not been prebroken but was large with large chunks there would necessarily be a period during which the temperature would build up to about 350° F. by allowing the pressure to build up in the cooker. This high temperature treatment has the effect of breaking up the chunks. It is preferable to prebreak the material and cook the load under vacuum throughout the cycle.

Indirect Heat

Indirect heat is applied throughout the cooking cycle by admitting steam into the jacket of the kettle. Any convenient super-atmospheric pressure may be used, but the preferred pressure is one corresponding to the saturated temperature over 250° F. This has been found to give a high rate of heat transfer without adversely affecting the quality of the finished product. A driving force of at least 40° F. between the temperature of the load and the temperature of saturated water vapor at the pressure of the kettle over the load is necessary to maintain a practical rate of moisture vapor evolution from the cooking load.

Injection Steam

Injection steam may be left on during the entire cooking cycle. For convenience, more than necessity, it is desirable to turn the injection steam off during the last few minutes of each cycle during the dumping of the load and during the first few minutes of loading a new charge. The necessity for this is avoidance of annoying steam in the room when the cooker is open to the room. After part of the charge has been loaded the steam may be turned on full, without a substantial quantity of vapor issuing from the charging doors. The injection steam must be clean and dry to avoid introducing contamination and undesirable moisture. The injection steam is not an important source of heat for cooking, but, it is an important source of energy for very rapid heating of the load during the loading and at the very beginning of each cycle. This results in condensation of water in the load which must be later evaporated by heat energy transferred from the steam in the jacket.

Shaft Speed

The shaft speed of the agitator should be as high as possible. A speed of 90 r.p.m.'s is better than a 45 r.p.m., which is better than 38 r.p.m. The loss through the vacuum line has been observed to be due to foaming and not to the speed of agitation.

Cooker Operation

It has been found desirable, but not necessary, to employ two cookers. The fat is introduced into the first cooker employing prime steam injections throughout the cooking period. The load is then removed from the cooker and the supernatant lard removed from the partially rendered proteinous material. This proteinous material is then transferred to a second cooker where it is finished, employing a normal dry rendering procedure. When removed from this second cooker it is sufficiently dry for pressing.

A single cooker cycle may be employed and the prime steam is introduced throughout the continuous operation as well as the vacuum and the agitation, and the load will cook in a single cooker to completion in a single, continuous operation.

A Typical Cooking Run

A modified 4 ft. by 8 ft. rendering cooker is filled with raw fat to a depth of approximately one-half full. This amounts to approximately 3500 lbs. This loading takes about 5 minutes. Since the jacket steam is turned on at all times heating of the charge commences as soon as the loading starts. Prime steam is injected as soon as about one-half the charge is in the cooker. The agitator shaft is kept turning during the loading operation. As soon as the loading is completed the charging gate is closed and the vacuum pump starts to create a negative pressure in the cooker. Heating of the charge and the decreasing of the pressure in the kettle comes into equilibrium when a fat temperature of 180° F. and a vacuum of 15 inches of mercury is obtained. This is about 5 minutes after the completion of the loading operation and about 10 minutes after the commencement of the loading operation. The indicated temperature of the load very slowly increases. This corresponds to a decrease rate of evaporation from the fat particles. The indicated temperature increases slowly until dryness is reached and then suddenly surges upward. There is no sudden increase in temperature during the drying operation. A temperature of 250° F. represents a satisfactory finishing point. The fat is completely rendered and the tankage is dry enough to be properly pressed in a screw press. In order to press satisfactorily the proteinous residue or tankage must contain less than 20% moisture. The most desirable range lies between 6 and 12% moisture as measured in a finished press tankage as sampled at the discharge of the screw press.

A comparison of the dry rendering process and the prime steam process where the two processes are run under identical conditions is set forth in the following table. The only difference between the prime steam cookers and the dry rendering cookers is the introduction of steam in the prime steam cooker. That is, the agitation was the same, the vacuum was the same and it can be seen that the charges were approximately the same.

| Dry Rendered, Dryer No. | Wgt. of Raw Fat | | Lard Yield w/o Crax | | Estimated Standard Yield | | Wet Crax Yield | | Yield Percent Wet Crax and Lard |
|---|---|---|---|---|---|---|---|---|---|
| | Lbs. | Percent | Lbs. | Percent | Lbs. | Percent | Lbs. | Percent | |
| 1 | 3,534 | 100 | 2,430 | 68.8 | 2,735 | 77.4 | 530 | 15 | 83.8 |
| 3 | 3,573 | 100 | 1,910 | 53.5 | 2,508 | 70.2 | 1,005 | 28.1 | 81.6 |
| 5 | 3,339 | 100 | 1,500 | 44.9 | 1,931 | 57.8 | 1,372 | 41.0 | 85.9 |
| 7 | 3,431 | 100 | 2,320 | 66.6 | 2,734 | 79.7 | 907 | 26.1 | 92.7 |
| 9 | 3,376 | 100 | 1,145 | 33.9 | 2,407 | 71.3 | 1,854 | 54.9 | 88.8 |
| 11 | 3,501 | 100 | 905 | 24.8 | 2,650 | 73.6 | 1,640 | 44.1 | 68.9 |
| Totals | 20,904 | 100 | 10,210 | 48.8 | 14,965 | 71.6 | 7,308 | 34.9 | 83.8 |

RESULTS AND YIELDS OF PRIME STEAM COOKERS

| Prime Steam, Dryer No. | Wgt. of Raw Fat | | Lard Yield w/o Crax | | Estimated Standard | | Wet Crax Yield | | Yield of Wet Crax |
|---|---|---|---|---|---|---|---|---|---|
| | Lbs. | Percent | Lbs. | Percent | Lbs. | Percent | Lbs. | Percent | Percent |
| 2 | 3,457 | 100 | 1,390 | 39.1 | 2,320 | 67.1 | 1,831 | 53.0 | 92.1 |
| 4 | 3,457 | 100 | 1,960 | 56.7 | 2,643 | 76.5 | 1,252 | 36.2 | 92.9 |
| 6 | 3,408 | 100 | 1,550 | 45.5 | 2,489 | 73.0 | 1,769 | 51.9 | 97.4 |
| 8 | 3,321 | 100 | 1,880 | 56.6 | 2,330 | 70.2 | 1,302 | 39.2 | 95.8 |
| 10 | 3,496 | 100 | 1,205 | 34.5 | 2,206 | 63.0 | 2,042 | 58.4 | 92.9 |
| Totals | 17,139 | 100 | 7,985 | 56.6 | 11,988 | 69.9 | 8,196 | 47.8 | 94.4 |

TOTALS ON THE TWO METHODS FOR THE ENTIRE OPERATION

| Dryers | Wgt. of Fat | | Lard Yield w/o Crax | | Estimated Standard Yield | | Wet Crax Yield | | Yield Percent Wet Crax and Lard |
|---|---|---|---|---|---|---|---|---|---|
| | Lbs. | Percent | Lbs. | Percent | Lbs. | Percent | Lbs. | Percent | |
| 6 D.R. | 20,904 | 100 | 10,210 | 48.8 | 14,965 | 71.6 | 7,308 | 34.9 | 83.8 |
| 5 P.S. | 17,139 | 100 | 7,985 | 46.6 | 11,988 | 69.9 | 8,196 | 47.8 | 94.4 |
| Total | 38,043 | 100 | 18,195 | 47.8 | 26,953 | 70.8 | 15,504 | 40.7 | 88.6 |

Lard yield w/o crax was the lard which was drained from the percolator box. It does not include the lard from the crax.

The stability and the color index of each run of lard was determined as set forth in the following table:

| Sample No. | Method | AOM Stability | Lovibond Red Color |
|---|---|---|---|
| 1 | DR | 7 | .76 |
| 2 | PS | 13 | .39 |
| 3 | DR | 7 | .51 |
| 4 | PS | 12.5 | .21 |
| 5 | DR | 7 | .51 |
| 6 | PS | 12.5 | .25 |
| 7 | DR | 6.5 | .38 |
| 8 | PS | 12.5 | .23 |
| 9 | DR | 6.5 | .42 |
| 10 | PS | 13.5 | .32 |
| 11 | DR | 7 | .38 |
| Averages | DR | 6.83 | .49 |
|  | PS | 12.8 | .28 |

The prime steam lard produced according to the present invention, compared to dry rendered lard has the following properties:

|  | Dry Rendered Lard | Prime Steam Lard |
|---|---|---|
| Free Fatty Acid, Percent | 0.2 | 0.1 |
| Peroxide Value, meq./kg | 1.5 | 0.7 |
| Taste Score | 4.5 | 6.5 |

While in the above examples hog fat was used, other fats will also give a higher stability product when rendered with vacuum and prime steam.

This invention is not to be limited by the example given but is only limited by the claims attached hereto.

What is claimed is:

1. A process for recovering fats from fatty tissue of animals, comprising:
    (a) introducing said fats into a jacketed kettle, to fill said kettle up to approximately half full,
    (b) applying heat to the walls of said kettle to maintain at least 40° F. temperature differential between the load in said kettle and the saturated water vapor surrounding said kettle, and simultaneously therewith
    (c) applying a vacuum of about fifteen inches of mercury to said kettle during rendering,
    (d) introducing live steam into said kettle during the entire cooking cycle,
    (e) heating until equilibrium between condensation and evaporation is reached at approximately 250° F., and
    (f) removing the separated fats from the protein tissue.

2. A process as claimed in claim 1, wherein the contents of said kettle are agitated continuously.

3. A method of recovering lard having a stability of approximately 12.5 hours, from hog fatty tissue, without hydrolyzing the protein content thereof, which comprises:
    (a) comminuting said fatty tissue,
    (b) introducing said fats into a jacketed kettle, to fill said kettle up to approximately half full,
    (c) heating the walls of said kettle to maintain at least a 40° F. temperature differential between the load in the kettle and the saturated water vapor surrounding said kettle, and simultaneously therewith
    (d) applying a vacuum of about fifteen inches of mercury to said kettle during rendering,
    (e) introducing live steam into said kettle during the entire cooking cycle,
    (f) agitating the contents of the kettle continuously,
    (g) heating until equilibrium between condensation and evaporation is reached at approximately 250° F.,
    (h) removing the contents of the kettle when it has reached a temperature of 250° F., and
    (i) separating the liquid fats from the solid protein.

References Cited in the file of this patent

UNITED STATES PATENTS

| 973,327 | Wannenwetsch | Oct. 18, 1910 |
| 1,833,826 | Cullen | Nov. 24, 1931 |
| 2,820,804 | Gordon | Jan. 21, 1958 |
| 3,025,315 | Krumm et al. | Mar. 13, 1962 |